(12) United States Patent
Guennouni et al.

(10) Patent No.: US 7,504,468 B2
(45) Date of Patent: Mar. 17, 2009

(54) SINGLE-COMPONENT POLYORGANOSILOXANE COMPOSITIONS WHICH CROSSLINK INTO SILICONE ELASTOMERS

(75) Inventors: Nathalie Guennouni, Irigny (FR); Marc Chaussade, Villeurbanne (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 10/562,049

(22) PCT Filed: Jun. 9, 2004

(86) PCT No.: PCT/FR2004/001425

§ 371 (c)(1),
(2), (4) Date: Feb. 26, 2007

(87) PCT Pub. No.: WO2005/003223

PCT Pub. Date: Jan. 13, 2005

(65) Prior Publication Data

US 2007/0191541 A1      Aug. 16, 2007

(30) Foreign Application Priority Data

Jun. 25, 2003   (FR) .................................. 03 07653

(51) Int. Cl.
    C08G 77/08     (2006.01)
(52) U.S. Cl. ...................................................... 528/17
(58) Field of Classification Search .................. 528/17; 524/731
    See application file for complete search history.

(56) References Cited

U.S. PATENT DOCUMENTS

| 3,719,634 A | 3/1973 | Clark et al. |
| 3,779,986 A | 12/1973 | Smith et al. |
| 5,428,103 A | 6/1995 | Friebe et al. |
| 5,519,104 A * | 5/1996 | Lucas ........................... 528/18 |
| 5,534,563 A * | 7/1996 | Lin et al. ...................... 523/122 |
| 5,908,909 A * | 6/1999 | De Buyl et al. ................ 528/17 |
| 6,777,471 B1 | 8/2004 | Dalbe et al. |

FOREIGN PATENT DOCUMENTS

| EP | 0866099 A2 | 9/1998 |
| FR | 2142050 | 1/1973 |
| FR | 2786497 | 6/2000 |
| WO | WO 02/083778 A1 | 10/2002 |

OTHER PUBLICATIONS

English translation of WO-02/83778.*
International Search Report Corresponding to PCT/FR 2004/001425 Issued on Dec. 3, 2004, 8 Pages.

* cited by examiner

Primary Examiner—Randy Gulakowski
Assistant Examiner—Robert Loewe
(74) Attorney, Agent, or Firm—Buchanan, Ingersoll & Rooney P.C.

(57) ABSTRACT

Single-component silicone compositions which are stable on storage in the absence of moisture and which crosslink by polycondensation reactions catalyzed using a mixed titanium/metal catalyst to give non-yellowing elastomers which adhere to various supports, the reactions being carried out at ambient temperature and in the presence of water; each single-component POS composition comprises: 100 parts by weight of linear diorganopolysiloxane(s) A functionalized at the chain ends by functional group $R^{fo}$ of alkoxy, acyloxy, iminoxy or enoxy type; 0 to 30 parts by weight of polysiloxane resin(s) B; 0 to 15 parts by weight of crosslinking agent(s) C; 0 to 2 parts by weight of aliphatic alcohol(s) E; 0 to 30 parts by weight of non-functionalized and unreactive linear diorganopolysiloxane(s) F; 2 to 40 parts by weight of inorganic filler G; 0 to 20 parts by weight of auxiliary agent(s) H; and 1 to 150 μg.at (microgram atom) of the metals M1+M2 per 1 g of single-component POS composition, wherein M1 is selected from among titanium, zirconium and mixtures thereof and M2 is selected from among zinc, aluminum, boron, bismuth and mixtures thereof.

9 Claims, No Drawings

SINGLE-COMPONENT POLYORGANOSILOXANE COMPOSITIONS WHICH CROSSLINK INTO SILICONE ELASTOMERS

CROSS-REFERENCE TO PRIORITY/PCT APPLICATIONS

This application claims priority under 35 U.S.C. § 119 of FR 03/07653, filed Jun. 25, 2003, and is the National Phase of PCT/FR 2004/001425, filed Jun. 9, 2004 and designating the United States, published on Jan. 13, 2005 as WO 2005/003223 A1, each hereby expressly incorporated by reference and each assigned to the assignee hereof.

The field of the invention is that of single-component silicone mastics which are stable on storage in the absence of moisture and which crosslink by polycondensation reactions catalyzed using a mixed titanium/metal catalyst to give nonyellowing elastomers which adhere to various supports, the reactions being carried out at ambient temperature (for example, 5 to 35° C.) and in the presence of water (for example, ambient moisture).

Such mastics based on silicone elastomers are used in numerous applications, in particular in the construction industry, as means for rendering leaktight, for pointing, for coating and/or for assembling, inter alia. The rheological properties of these single-component silicone mastics (pasty form) form the subject of much attention in these applications. It is the same as regards their resistance to bad weather and to heat, their flexibility at low temperature, their ease of use and their rapid crosslinking/curing in situ on contact with atmospheric moisture.

The polycondensation reactions referred to above are those where Si—OR$^0$ bonds react with one another (the substituent R$^0$ can, for example, be an alkyl, acyl or imino residue) in the presence of water. In the case where R$^0$ is, for example, an alkyl residue, the polycondensation reactions in question then give off an alcohol R$^0$OH. Generally, the kinetics of the polycondensation reactions are extremely slow; these reactions are thus catalyzed by an appropriate catalyst.

Recourse is generally had, as catalysts which are used, to catalysts based on tin, on titanium or on an amine or compositions of these catalysts. The catalysts based on tin (cf. in particular FR-A-2 557 582) and on titanium (cf. in particular FR-A-2 786 497) are catalysts having a satisfactory effectiveness. Other catalysts are sometimes mentioned, such as catalysts based on zinc, on zirconium or on aluminum, but they have only been used to a slight extent industrially because of their mediocre effectiveness.

Tin-based catalysts are widely employed but their use sometimes suffers from the marked toxicity of tin and it is important, for this reason, to find other catalysts which are as effective but less toxic. Titanium-based catalysts, which are also widely employed, exhibit two major disadvantages, however: they have slower kinetics than tin-based catalysts and, in the case of the preparation of neutral single-component silicone compositions (where R$^0$ is an alkyl or imino residue), elastomers are obtained which retain a tacky surface feel several hours after having a skin and, during this time, they remain sensitive to the capture of dust, for example. It should be added to this that the mastics catalyzed by tin frequently exhibit problems of stability, in particular when they give off an alcohol, which is not generally the case when the catalyst is a titanium-based compound.

It is known that mixed titanium/tin catalysis (cf. in particular SU-A-1 594 195) makes it possible to improve the performance of catalysis with titanium but once again the presence of tin is encountered.

It has now been found, and it is this which constitutes the essential object targeted by the present invention, that it is possible:
first, to substantially accelerate the setting kinetics related to the use of titanium-based catalysts by introducing, into the crosslinkable single-component POS composition, a mixed catalyst consisting of the combination of a titanium-based compound with a specific metal compound in which the metal is other than tin; and
secondly, to achieve surface crosslinking kinetics which, to say the least, are very close to those provided by the tin-based catalyst used alone;
finally, to use only a small amount of titanium-based compound (which is known to sometimes bring about yellowing of the compositions) by combining it with a specific metal compound which will be completely colorless, which then makes it possible to greatly reduce the level of yellowing possible for the mastic, this measure being particularly advantageous in the case where it is desired to have available translucent mastics.

The advantages attached to the use of the present invention are thus summarized as follows:
kinetics. very similar to those of the tin-based catalyst are encountered;
the tacky feel of the surface of the elastomer in the first days following crosslinking is reduced or eliminated;
no tin is introduced;
the ability of the mastic to turn yellow can be reduced by lowering the level of titanium.

It has also been demonstrated that: the abovementioned advantages are still obtained when, in the combination mentioned above, the titanium-based compound is replaced by a zirconium-based compound; there exists a marked synergistic effect between the two metal compounds used in combination in accordance with the content of the present invention.

More specifically, the present invention relates, in its first subject matter, to a single-component polyorganosiloxane composition (POS) which is stable on storage in the absence of moisture and which crosslinks in the presence of water to give a nonyellowing and adherent elastomer, said composition comprising:

(i) at least one crosslinkable linear polyorganopolysiloxane A of formula:

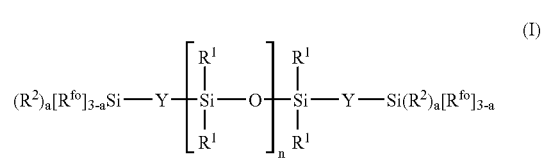

(I)

in which:
the substituents R$^1$, which are identical or different, each represent a saturated or unsaturated, substituted or unsubstituted, aliphatic, cyclanic or aromatic, C$_1$ to C$_{13}$ mono-valent hydrocarbon radical;
the substituents R$^2$, which are identical or different, each represent a saturated or unsaturated, substituted or unsubstituted, aliphatic, cyclanic or aromatic, C$_1$ to C$_{13}$ mono-valent hydrocarbon radical;

the functionalization substituents $R^{fo}$, which are identical or different, each represent:
an iminoxy residue of formula:

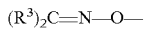
$(R^3)_2C=N-O-$ with $R^3$ independently representing a linear or branched $C_1$ to $C_8$ alkyl, a $C_3$ to $C_8$ cycloalkyl or a $C_2$-$C_8$ alkenyl;

an alkoxy residue of formula:

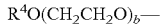
$R^4O(CH_2CH_2O)_b-$ with $R^4$ independently representing a linear or branched $C_1$ to $C_8$ alkyl or a $C_3$ to $C_8$ cycloalkyl and b=0 or 1;

an acyloxy residue of formula:

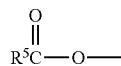

with $R^5$ representing a saturated or unsaturated, substituted or unsubstituted, aliphatic, cyclanic or aromatic, $C_1$ to $C_{13}$ monovalent hydrocarbon radical;

an enoxy residue of formula:

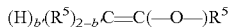
$(H)_{b'}(R^5)_{2-b'}C=C(-O-)R^5$ where $R^5$ is as defined above and b'=0, 1 or 2;

each symbol Y represents an oxygen atom or a divalent hydrocarbon group;

n has a value sufficient to confer, on the POS A, a dynamic viscosity at 25° C. ranging from 1000 to 1 000 000 mPa·s;

a is zero or 1;

(2i) optionally at least one polyorganosiloxane resin B functionalized by at least one radical $R^{fo}$ corresponding to the definition given above and exhibiting, in its structure, at least two different siloxyl units chosen from those of formulae $(R^1)_3SiO_{1/2}$ (M unit), $(R^1)_2SiO_{2/2}$ (D unit), $R^1SiO_{3/2}$ (T unit) and $SiO_2$ (Q unit), at least one of these units being a T or Q unit, the radicals $R^1$, which are identical or different, having the meanings given above with respect to the formula (I), said resin having a content by weight of functional radicals $R^{fo}$ ranging from 0.1 to 10%, it being understood that a portion of the radicals $R^1$ are radicals $R^{fo}$;

(3i) optionally at least one crosslinking agent C of formula:

$(R^2)_aSi[R^{fo}]_{4-a}$      (II)

with $R^2$, $R^{fo}$ and a being as defined above;

(4i) optionally a residual amount of the functionalization catalyst D in the presence of which the preparation of the POS(s) A and of the optional resin(s) B which are functionalized by $R^{fo}$ takes place;

(5i) optionally at least one primary aliphatic $C_1$ to $C_3$ alcohol E;

(6i) optionally at least one unreactive linear polydiorganosiloxane F which is not functionalized by $R^{fo}$ and which has the formula:

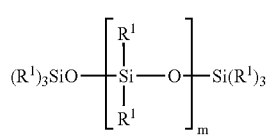
(III)

in which:
the substituents $R^1$, which are identical or different, have the same meanings as those given above for the polyorganosiloxane A of formula (I);

m has a value sufficient to confer, on the polymer of formula (III), a dynamic viscosity at 25° C. ranging from 10 to 200 000 mPa·s;

(7i) at least one inorganic filler G;

(8i) optionally at least one auxiliary agent H known to a person skilled in the art which is generally chosen, when it is needed, according to the applications in which the compositions according to the present invention are employed;

(9i) an effective amount of a crosslinking/curing catalyst I;

said composition being characterized by the following points (α), (β) and (γ):

(α) the curing catalyst I consists of the combination of at least one organic derivative I1 of a metal M1 chosen from titanium, zirconium and their mixtures with at least one organic derivative I2 of a metal M2 chosen from zinc, aluminum, boron, bismuth and their mixtures;

(β) the number of μg.at (microgram atoms) of the metals M1+M2 introduced into 1 g of single-component composition comprising all the ingredients (i) to (8i) lies within the range extending from 1 to 150 and preferably extending from 6 to 90;

(γ) the ratio:

$$\frac{\text{number of μg.at of } M2}{\text{total number of μg.at of } M1+M2} \times 100$$

lies within the range extending from 5 to 95% and preferably extending from 8 to 92%.

The single-component silicone mastic composition according to the invention has all the advantageous and specific properties of this type of product and exhibits, in addition, the following advantages, already mentioned above:

kinetics very similar to those of the tin-based catalyst are encountered;

the tacky feel of the surface of the elastomer in the first days following crosslinking is reduced or eliminated;

no tin is introduced;

the ability of the mastic to turn yellow can be reduced by lowering the level of metal M1.

In addition, the mastic composition according to the invention is economical and results in crosslinked elastomers possessing advantageous mechanical properties which adhere to numerous substrates, without even the presence of an adhesion promoter or auxiliary being absolutely essential.

The composition according to the invention corresponds to an embodiment in which the essential constituent, namely the POS A, is at least partially functionalized at its ends by the following methods:

when Y represents an oxygen atom: carrying out a condensation reaction between the end ≡Si—OH units of a precursor α,ω-hydroxylated POS A' and a functional group $R^{fo}$ of a silane carrying functional groups $R^{fo}$; and when Y represents a divalent hydrocarbon group: carrying out an addition reaction between the end ≡Si—H units of a precursor α,ω-hydro POS A" and an olefinic silane carrying functional groups $R^{fo}$; or alternatively an addition reaction between the unsaturated ends (for example, vinyl or allyl) of a POS A'" and a hydrosilane carrying functional groups $R^{fo}$.

The POS A is functionalized according to techniques known to a person skilled in the art. This functionalized POS A corresponds to a stable form, in the absence of moisture, of the single-component mastic considered here. In practice, this stable form is that of the composition packaged in hermetically sealed cartridges which will be opened by the operator during use and which will allow him to apply the mastic over all the supports desired.

The hydroxylated precursor A' of the POS A functionalized by $R^{fo}$ at the chain ends is an α,ω-hydroxylated polydiorganosiloxane of formula:

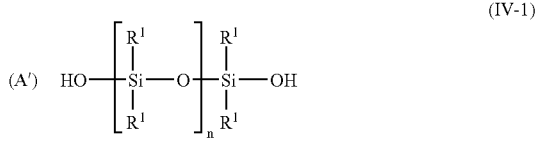

(IV-1)

with $R^1$ and n being as defined above in the formula (I).

The hydro precursor A" of the POS A functionalized by $R^{fo}$ at the chain ends is an α,ω-hydro polydiorgano-siloxane of formula:

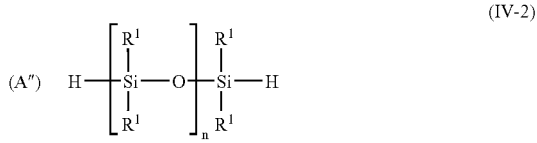

(IV-2)

with $R^1$ and n being as defined above in the formula (I).

The precursor A'" of the POS A functionalized by $R^{fo}$ at the chain ends is a pqlydiorganosiloxane corresponding to the definition given above for A", except that the end hydrogen atoms are replaced by unsaturated groups.

The optional resin POS B functionalized by $R^{fo}$ is produced in the same way as the POS A functionalized by $R^{fo}$, by condensation with the crosslinking silicone C carrying functionalization radicals $R^{fo}$. The precursor of the resin POS B functionalized by $R^{fo}$ is then a hydroxylated resin POS B' corresponding to the definition given above for B, except that a portion of the radicals $R^1$ correspond to OH groups.

The resin POS B functionalized by $R^{fo}$ can also be produced by reaction of a precursor resin POS B" carrying ≡Si—H units with an olefinic silane carrying functional groups $R^{fo}$. This resin corresponds to the definition given above for B, except that a portion of the radicals $R^1$ are now hydrogen atoms.

The single-component mastic composition according to the invention can be of the acid type (in this case, the functionalization $R^{fo}$ represents an acyloxy residue) or alternatively of the neutral type (in this case, the functionalization $R^{fo}$ represents an alkoxy or iminoxy or enoxy residue).

It should be noted that at least a part of the inventive nature of the mastic according to the invention is due to the judicious and advantageous selection of the combinations defined for metal compounds I1 and I2 used as curing catalyst I.

According to a preferred embodiment of the invention, the single-component silicone composition concerned on the one hand comprises, as POS A, a polymer of formula (I) in which the symbol Y represents an oxygen atom and, on the other hand, is of a neutral type according to which the functionalization substituents $R^{fo}$ of the ingredients A, B and C, which are identical or different, each represent:

an iminoxy residue of formula:

$(R^3)_2C\!=\!N\!-\!O\!-\!$ with $R^3$ independently representing a linear or branched $C_1$ to $C_8$ alkyl, a $C_3$ to $C_8$ cycloalkyl or a $C_2$-$C_8$ alkenyl, preferably selected from the group consisting of methyl, ethyl, propyl, butyl, vinyl and allyl;

and/or an alkoxy residue of formula:

$R^4O(CH_2CH_2O)_b\!-\!$ with $R^4$ independently representing a linear or branched $C_1$ to $C_8$ alkyl or a $C_1$ to $C_8$ cycloalkyl, preferably selected from the group consisting of methyl, ethyl, propyl, butyl and methyl glycol, and b=0 or 1.

This is because it could be observed that the problems of stability in the cartridge and of yellowing are more acute in the case where the mastics concerned are neutral single-component silicone mastics of iminoxy or alkoxy type.

According to a more preferred embodiment of the invention:

the POS A is a polymer of formula (I) in which the symbol Y represents an oxygen atom;

the functionalization substituents $R^{fo}$ are of alkoxy type and correspond to the formula $R^4O(CH_2CH_2O)_b\!-\!$ as defined above; and the crosslinking/curing catalyst I consists of a combination:

of at least one organic derivative I1 of a metal M1 chosen from the group consisting of:

monomers I1.1 of formula:

$$[L]_cM1[(OCH_2CH_2)_dOR^7]_{4-c} \qquad (V)$$

in which:

the symbol L represents a σ donor ligand, with or without π participation, such as, for example, the ligands of the type of those derived from acetylacetone, from β-keto esters, from malonic esters and from acetylimines;

c represents 0, 1, 2, 3 or 4;

M1 is a metal chosen from titanium, zirconium and their mixtures;

the substituents $R^7$, which are identical or different, each represent a linear or branched $C_1$ to $C_{12}$ alkyl radical;

d represents zero, 1 or 2;

with the conditions according to which, when the symbol d represents zero, the alkyl radical $R^7$ has from 2 to 12 carbon atoms and, when the symbol d represents 1 or 2, the alkyl radical $R^7$ has from 1 to 4 carbon atoms;

polymers I1.2 resulting from the partial hydrolysis of the monomers of formula (V) in which the symbol c is at most equal to 3 and the symbol $R^7$ has the abovementioned meaning with the symbol d representing zero; with at least one organic derivative I2 of a metal M2 chosen from the group consisting of:

the polycarboxylates I2.1 of formula:

$$M2(R^8COO)_v \qquad (VI)$$

the metal alkoxides and/or chelates I2.2 of formula:

$$(L)_eM2(OR^9)_{v-e} \qquad (VII)$$

in which formulae:

the substituents $R^8$, which are identical or different, each represent a linear or branched $C_1$ to $C_{20}$ alkyl radical;

the symbol $R^9$ has the meaning given above in the formula (V) for $R^7$;

the symbol L represents a σ donor ligand, with or without π participation, such as, for example, the ligands of the type of those derived from acetylacetone, from β-keto esters, from malonic esters and from acetylimines;

M2 is a metal of valency v chosen from zinc, aluminum, bismuth, boron and their mixtures;

e represents a number ranging from zero to v.

Without this being limiting, it should be considered that the choices:

as metal M1: of titanium, and as metal M2: of zinc, of aluminum or of their mixtures, are particularly appropriate choices in carrying out the present invention.

The use of these curing catalysts I in the compositions according to the invention makes it possible to obtain particularly surprising and unexpected results marked by a synergy as regards in particular skin formation time and hardness, in comparison with what occurs when the metal compounds I1 and I2 taken separately are used.

The single-component organopolysiloxane compositions according to the present invention can additionally comprise one or more auxiliary agent(s) H, such as in particular, per 100 parts by weight of linear diorganopolysiloxane polymer(s) A:

optionally from 0.1 to 10 parts of an adhesion agent H1, optionally an effective amount of at least one compound taken from the group formed by: anti-fungals H2; bactericides H3; inert organic diluents H4 (such as, in particular: petroleum fractions of high boiling point, toluene, xylene, heptane, white spirit, trichloroethylene or tetrachloroethylene); plasticizers H5 belonging, for example, to the group of the alkylbenzenes with a molecular weight of greater than 200 g/mol comprising a branched or unbranched alkyl residue having from 10 to 30 carbon atoms; thixotropic agents H6; stabilizing agents H7 (such as, in particular: an iron or cerium-organic acid salt, for example iron or cerium octoate; a cerium oxide, a cerium hydroxide, an iron oxide, the oxide CaO or the oxide MgO); or colored pigments H8.

Preferably, the adhesion agent H1, when one of them is used, is chosen from organosilicon compounds carrying both (1) hydrolyzable groups bonded to the silicon atom and (2) organic groups substituted by radicals chosen from the group of the isocyanato, epoxy, alkenyl, isocyanurate and (meth)acrylate radicals.

Mention may be made, by way of illustration of adhesion agents H1, of the organosilicon compounds defined below:

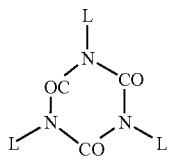

where L=—(CH$_2$)$_3$—Si(OCH$_3$)$_3$, (3-glycidoxypropyl)trimethoxysilane (GLYMO), vinyltrimethoxysilane (VTMS), methacryloyloxypropyltrimethoxysilane (MEMO), and their mixtures.

In order to explain in somewhat more detail the nature of the constituent components of the composition according to the invention, it is important to specify that the substituents $R^1$ of the polymers POS A functionalized by $R^{fo}$, of the resins B functionalized by $R^{fo}$ and of the optional nonfunctionalized polymers F are selected from the group formed by:

alkyl and haloalkyl radicals having from 1 to 13 carbon atoms, cycloalkyl and halocycloalkyl radicals having from 5 to 13 carbon atoms, alkenyl radicals having from 2 to 8 carbon atoms, mononuclear aryl and haloaryl radicals having from 6 to 13 carbon atoms, cyanoalkyl radicals, the alkyl members of which have from 2 to 3 carbon atoms, the methyl, ethyl, propyl, isopropyl, n-hexyl, phenyl, vinyl and 3,3,3-trifluoropropyl radicals being particularly preferred.

More specifically still, and without implied limitation, the substituents $R^1$ mentioned above for the polymers POS A and F (optional) comprise:

alkyl and haloalkyl radicals having from 1 to 13 carbon atoms, such as the methyl, ethyl, propyl, isopropyl, butyl, pentyl, hexyl, 2-ethylhexyl, octyl, decyl, 3,3,3-trifluoropropyl, 4,4,4-trifluorobutyl or 4,4,4,3,3-pentafluorobutyl radicals, cycloalkyl and halocycloalkyl radicals having from 5 to 13 carbon atoms, such as the cyclopentyl, cyclo-hexyl, methylcyclohexyl, propylcyclohexyl, 2,3-di-fluorocyclobutyl or 3,4-difluoro-5-methylcycloheptyl radicals, alkenyl radicals having from 2 to 8 carbon atoms, such as the vinyl, allyl or buten-2-yl radicals, mononuclear aryl and haloaryl radicals having from 6 to 13 carbon atoms, such as the phenyl, tolyl, xylyl, chlorophenyl, dichlorophenyl or trichlorophenyl radicals, cyanoalkyl radicals, the alkyl members of which have from 2 to 3 carbon atoms, such as the β-cyanoethyl and γ-cyanopropyl radicals.

Mention may be made, as concrete examples of siloxyl units D, $(R^1)_2SiO_{2/2}$, present in the diorgano-polysiloxanes A functionalized by $R^{fo}$ of formula (I), in the precursors A' and A" of formula (IV) and in the optional unreacted diorganopolysiloxanes F of formula (III), of:

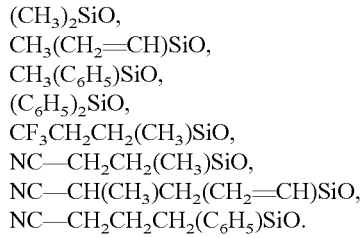

It should be understood that, in the context of the present invention, use may be made, as precursor polymers A' and A" of formula (IV), of a mixture composed of several polymers which differ from one another in the value of the viscosity and/or the nature of the substituents bonded to the silicon atoms. Moreover, it should be indicated that the polymers A' and A" of formula (IV) can optionally comprise siloxyl units T of formula $R^1SiO_{3/2}$ and/or siloxyl units Q, $SiO_{4/2}$, in the proportion of at most 1% (this % expressing the number of T and/or Q units per 100 silicon atoms). The same comments apply to the unreactive polymers F (optional) of formula (III).

The substituents $R^1$ of the functionalized polymers A, of the precursor polymers A' and A" and of the unreactive nonfunctionalized polymers F (optional) advantageously used, because of their availability in industrial products, are the methyl, ethyl, propyl, isopropyl, n-hexyl, phenyl, vinyl and 3,3,3-trifluoropropyl radicals. More advantageously, at least 80% by number of these substituents are methyl radicals.

Use is made of precursor polymers A' and A" having a dynamic viscosity at 25° C. ranging from 1000 to 1 000 000 mPa·s and preferably ranging from 10 000 to 200 000 mPa·s.

As regards the nonfunctionalized polymers F (optional), they exhibit a dynamic viscosity at 25° C. ranging from 10 to 200 000 mPa·s and preferably ranging from 50 to 150 000 mPa·s.

The unreactive and nonfunctionalized polymers F, when they are used, can be introduced all at once or in several fractions and at several stages or at a single stage of the preparation of the composition. The optional fractions can be identical or different in terms of nature and/or of proportions. Preferably, F is introduced all at once at a single stage.

Mention may be made, as examples of substituents $R^1$ of the resins POS B functionalized by $R^{fo}$ which are suitable or which are advantageously used, of the various radicals $R^1$ of the type of those mentioned by name above for the functionalized polymers A, the precursor polymers A' and A" and the unreactive and nonfunctionalized polymers F (optional). These silicone resins are well known branched polyorganosiloxane polymers, the processes for the preparation of which are described in numerous patents. Mention may be made, as concrete examples of resins which can be used, of the MQ, MDQ, TD and MDT resins.

Preferably, mention may be made, as examples of resins which can be used, of the resins POS B functionalized by $R^{fo}$ not comprising a Q unit in their structure. More preferably, mention may be made, as examples of resins which can be used, of the functionalized TD and MDT resins comprising at least 20% by weight of T units and having a content by weight of group $R^{fo}$ ranging from 0.3 to 5%. More preferably still, use is made of resins of this type in the structure of which at least 80% by number of the substituents $R^1$ are methyl radicals. The functional groups $R^{fo}$ of the resins B can be carried by the M, D and/or T units.

As regards the functionalized POSs A and the crosslinking agents C, mention may be made, as concrete examples of substituents $R^2$ which are particularly suitable, of the same radicals as those mentioned by name above for the substituents $R^1$ of the functionalized polymers A, of the precursor polymers A' and A" and of the nonfunctionalized and unreactive polymers F.

As regards the constituent substituents $R^3$, $R^4$ and $R^5$ of the functionalization radicals $R^{fo}$, mention will preferably be made of $C_1$-$C_4$ alkyl radicals; the methyl, ethyl, propyl, isopropyl and n-butyl radicals prove to be more especially appropriate.

As regards each symbol Y, it represents, as has already been indicated, an oxygen atom or a divalent hydrocarbon group. Mention will preferably be made, as divalent hydrocarbon groups, of the methylene, ethylene, propylene or butylene groups; the ethylene group is more particularly preferred.

According to the "more preferred embodiment of the invention" already mentioned above, each symbol Y represents an oxygen atom and the functionalization radicals $R^{fo}$ are of alkoxy type and, in this context, according to an even more preferred embodiment, they result from silane crosslinking agents C chosen from the group consisting of:

Si(OCH$_3$)$_4$
Si(OCH$_2$CH$_3$)$_4$
Si(OCH$_2$CH$_2$CH$_3$)$_4$
(CH$_3$O)$_3$SiCH$_3$
(C$_2$H$_5$O)$_3$SiCH$_3$
(CH$_3$O)$_3$Si(CH=CH$_2$)
(C$_2$H$_5$O)$_3$Si(CH=CH$_2$)
(CH$_3$O)$_3$Si(CH$_2$—CH=CH$_2$)
(CH$_3$O)$_3$Si[CH$_2$—(CH$_3$)C=CH$_2$]
(C$_2$H$_5$O)$_3$Si(OCH$_3$)
Si(OCH$_2$—CH$_2$—OCH$_3$)$_4$
CH$_3$Si(OCH$_2$—CH$_2$—OCH$_3$)$_3$
(CH$_2$=CH)Si(OCH$_2$CH$_2$OCH$_3$)$_3$
C$_6$H$_5$Si(OCH$_3$)$_3$
C$_6$H$_5$Si(OCH$_2$—CH$_2$—OCH$_3$)$_3$.

In practice, the silane crosslinking agents C carrying the functionalization radicals $R^{fo}$ which are very especially well suited are: Si(OC$_2$H$_5$)$_4$, CH$_3$Si(OCH$_3$)$_3$, CH$_3$Si(OC$_2$H$_5$)$_3$, (C$_2$H$_5$O)$_3$Si(OCH$_3$), (CH$_2$=CH)Si(OCH$_3$)$_3$ or (CH$_2$=CH)Si(OC$_2$H$_5$)$_3$.

According to a noteworthy characteristic of the invention, the composition can additionally comprise at least one functionalization catalyst D, in the presence of which the reaction of the precursors A' and A" (and optionally of the precursors B' and B") with the appropriate silane carrying the functional groups $R^{fo}$ takes place, which reaction results in the POS A and in the resin B respectively.

In the case where the symbol Y represents an oxygen atom and where a condensation reaction of the hydroxylated precursors A' and optionally B' with the silane C occurs, this functionalization catalyst D can advantageously be selected from the following compounds:

potassium acetate (cf. U.S. Pat. No. 3,504,051),
various inorganic oxides (cf. FR-A-1 495 011),
carbamates (cf. EP-A-0 210 402),
lithium hydroxide (cf. EP-A-0 367 696),
sodium hydroxide or potassium hydroxide (cf. EP-A-0 457 693).

In some cases, it may be necessary to neutralize the functionalization catalyst. Thus, as regards lithium hydroxide, numerous products may be employed for this purpose, such as, for example:

trichloroethyl phosphate,
dimethylvinylsilyl acetate,
a silyl phosphate of the type of those described in French patent FR-B-2 410 004,
or a precipitated or fumed silica.

It is recommended, in the context of the present invention where the symbol Y represents an oxygen atom, to use lithium hydroxide, of formula LiOH or LiOH.H$_2$O, as functionalization catalyst D. It can be used, for example, in solution in at least one aliphatic alcohol E having from 1 to 3 carbon atoms, such as, for example, methanol, ethanol or isopropanol, or a mixture of these alcohols. When one (or more) alcohol(s) is (are) present in the reaction medium, the amount employed lies within the range extending from 0.1 to 2 parts by weight and preferably from 0.2 to 1 part by weight, per 100 parts of hydroxylated polymer(s) A'.

Use is made of an effective amount of functionalization catalyst D, that is to say an amount such that the functionalization reaction rate is as high as possible, in particular using Si(OC$_2$H$_5$)$_4$, CH$_3$Si(OCH$_3$)$_3$, CH$_3$Si(OC$_2$H$_5$)$_3$, (C$_2$H$_5$O)$_3$Si (OCH$_3$), (CH$_2$=CH)Si(OCH$_3$)$_3$ or (CH$_2$=CH)Si(OC$_2$H$_5$)$_3$ as functionalization agent, which is none other than the crosslinking agent C. In the majority of cases, use is made of 0.001 to 5 mol of catalyst D per 1 mol of silanol groups (=Si—OH) contributed, on the one hand, by the precursor(s) A' of the functionalized polymer(s) A and, on the other hand, by the precursor(s) B" of the functionalized resin(s) B. In the preferred case involving lithium hydroxide, use is made of 0.005 to 0.5 mol of LiOH per 1 mol of silanol groups of A' or B'.

The filler G provided is inorganic and can be composed of products chosen from siliceous or nonsiliceous materials.

As regards the siliceous materials, they can act as reinforcing or semireinforcing filler.

The reinforcing siliceous fillers are chosen from colloidal silicas, pyrogenic (or fumed) and precipitated silica powders, or their mixture.

These powders exhibit a mean particle size generally of less than 0.1 μm and a BET specific surface of greater than 50 m²/g, preferably of between 100 and 350 m²/g.

Semireinforcing siliceous fillers, such as amorphous silicas, diatomaceous earths or ground quartz, can also be employed.

As regards the nonsiliceous inorganic materials, they can be involved as semireinforcing or bulking inorganic filler. Examples of these nonsiliceous fillers, which can be used alone or as a mixture, are carbon black, titanium dioxide, aluminum oxide, alumina hydrate, expanded vermiculite, unexpanded vermiculite, calcium carbonate, zinc oxide, mica, talc, iron oxide, barium sulfate and slaked lime. These fillers. have a particle size generally of between 0.001 and 300 μm and a BET specific surface of less than 100 m²/g.

In practice but without implied limitation, the filler employed is pyrogenic silica powder; this silica is in the amorphous form when the aim is to obtain translucent mastics.

These fillers can be modified at the surface by treatment with the various organosilicon compounds commonly employed for this use. Thus, these organo-silicon compounds can be organochlorosilanes, diorgano-cyclopolysiloxanes, hexaorganodisiloxanes, hexaorgano-disilazanes or diorgano-cyclopolysilazanes (patents FR 1 126 884, FR 1 136 885, FR 1 236 505 and GB 1 024 234). The treated fillers include, in the majority of cases, from 3 to 30% of their weight of organosilicon compounds.

The purpose of the introduction of the fillers is to confer good mechanical and rheological characteristics on the elastomers resulting from the curing of the compositions in accordance with the invention. A single type of filler or mixtures of several types can be introduced.

As regards the curing catalyst I, mention may be made, as examples of symbols $R^7$ in the organic derivatives I1.1 of formula (V), of the methyl, ethyl, propyl, isopropyl, butyl, isobutyl, sec-butyl, tert-butyl, hexyl, 2-ethylhexyl, octyl, decyl and dodecyl radicals and, as examples of symbols L in the derivatives I1.1 of formula (V), of the acetylacetonate ligand.

Mention may be made, as concrete examples of monomers I1.1 of formula (V), of ethyl titanate or zirconate, propyl titanate or zirconate, isopropyl titanate or zirconate, butyl titanate or zirconate, 2-ethylhexyl titanate or zirconate, octyl titanate or zirconate, decyl titanate or zirconate, dodecyl titanate or zirconate, β-methoxyethyl titanate or zirconate, β-ethoxyethyl titanate or zirconate, β-propoxyethyl titanate or zirconate, the titanate or the zirconate of formula M1[(OCH₂CH₂)₂OCH₃]₄, bis(acetoacetonyl)diisopropyl titanate or zirconate, or bis(acetoacetonyl)dibutyl titanate or zirconate. The monomeric metal compounds I1.1 more particularly valued are the following products, taken alone or as a mixture: ethyl titanate, propyl titanate, isopropyl titanate or butyl (n-butyl) titanate.

Mention may be made, as concrete examples of polymers I1.2 originating from the partial hydrolysis of the monomers I1.1, of the polymers I1.2 originating from the partial hydrolysis of isopropyl, butyl or 2-ethylhexyl titanates or zirconates.

Mention may be made, as also regards the curing catalyst I, as examples of symbols $R^8$ and $R^9$ in the derivatives I2.1 and I2.2 of formulae (VI) and (VII), of the propyl, isopropyl, butyl (n-butyl), isobutyl, sec-butyl, tert-butyl, hexyl, 2-ethylhexyl, octyl, decyl and dodecyl radicals and, as examples of symbols L in the derivatives I2.2 of formula (VII), of the acetylacetonate ligand.

Mention may be made, as concrete examples of organic derivatives I2, of zinc dioctoate, tributyl borate, bismuth carboxylate and aluminum acetyl-acetonate. The compounds I2 more particularly valued are the following products, taken alone or as a mixture: zinc dioctoate, aluminum acetylacetonate or aluminum butoxide (linear or branched).

The respective amounts of each constituent I1 or I2 of the curing catalyst I can vary within wide limits, provided that they meet the abovementioned conditions (β) and (γ). These amounts are chosen according to the level of value desired as regards in particular skin formation time, persistence of a tacky feel, hardness and initial hardness/final hardness ratio. An excellent compromise in values for its usage properties is obtained using an amount of curing catalyst I such that:

(β) the number of μg.at (microgram atoms) of the metals M1+M2 introduced into 1 g of single-component composition comprising all the ingredients (i) to (8i) lies within the range extending from 25 to 55;

(γ) the ratio:

$$\frac{\text{number of μg.at of } M2}{\text{total number of μg.at of } M1 + M2} \times 100$$

lies within the range extending from 10 to 45%.

According to another preferred embodiment of the invention, the single-component POS composition comprises:

100 parts by weight of linear diorganopoly-siloxane(s) A functionalized by $R^{f\circ}$, 0 to 30, preferably 5 to 15, parts by weight of resin(s) B, 0 to 15, preferably 3.5 to 7, parts by weight of crosslinking agent(s) C, 0 to 2, preferably 0 to 1, parts by weight of alcohol(s) E, 0 to 30, preferably 5 to 20, parts by weight of nonfunctionalized and unreactive linear diorganopoly-siloxane(s) F, 2 to 40, preferably 8 to 20, parts by weight of inorganic filler G, 0 to 20 parts by weight of auxiliary agent(s) H, and an amount of curing catalyst I determined so as to contribute, to the composition, levels of metals M1+M2 which meet the general or preferred conditions (β) and (γ) mentioned above.

The compositions in accordance with the invention cure at ambient temperature and in particular at temperatures of between 5 and 35° C. in the presence of moisture. The curing (or the crosslinking) takes place from the exterior toward the interior of the body of the compositions. A skin is first formed at the surface and then the crosslinking continues in the body.

These compositions can be employed for multiple applications, such as pointing in the construction industry or the assembling and adhesive bonding of the most diverse materials (metals; plastics, such as, for example, PVC or PMMA; natural and synthetic rubbers; wood; board; earthenware; brick; glass; stone; concrete; masonry components), both in the context of the construction industry and in that of the automobile, domestic electrical appliance and electronics industries.

According to another of its aspects, another subject matter of the present invention (second subject matter of the invention) is a nonyellowing elastomer capable of adhering to various substrates and obtained by crosslinking and curing the single-component silicone mastic composition described above.

The single-component organopolysiloxane compositions in accordance with the present invention are prepared with the exclusion of moisture, the preparations being carried out in a closed reactor equipped with a stirrer in which it is possible, if need be, to apply vacuum and then optionally to replace the air expelled with an anhydrous gas, for example with nitrogen.

For this preparation, it is recommended to use equipment, operating batchwise or continuously, which makes it possible:

to intimately mix, with the exclusion of moisture:
in a stage 1, the following constituents: precursor POS A' or A" of the POS A functionalized by $R^{fo}$, precursor resin B' or B" (optional) of the resin POS B functionalized by $R^{fo}$, silane, optionally olefinic, carrying the functional groups $R^{fo}$ (which can be the silane C), functionalization catalyst D, alcohol E (optional) and nonfunctionalized and unreactive POS F (optional);
then, in a stage 2, the reaction mixture from stage 1 supplemented by the addition of the constituents G, H (optional), F (optional) and I; and to discharge the volatile materials present (polymers of low molecular weight, alcohol formed during the functionalization reaction, alcohol E optionally used) at various points in the implementation of the process:
during the abovementioned stage 1 and/or
during the abovementioned stage 2 and/or
in a final stage 3.

Other possible orders of introduction of the constituents, of course, exist for the implementation of this preparation process; for example, the following order of introduction could be used:

stage 1: A'+optionally B'+C+D+optionally E+optionally F+G, with discharge at this stage of the volatile materials;

stage 2: C+optionally H+optionally F+I.

Mention may be made, as examples of equipment, of slow dispersers, paddle, propeller, arm or anchor mixers, planetary mixers, hook mixers, or single-screw or multiple-screw extruders.

Each of the stages employed in this preparation is carried out at a temperature lying within the range extending from 10 to 110° C. Preferably, each of the stages is carried out at a temperature extending from 15 to 90° C.

Stage 1 is carried out for a period of time sufficient (for example, extending from 10 seconds to 10 minutes) to bring about a complete functionalization reaction or a functionalization reaction which is as close as possible to the maximum degree of functionalization accessible under the operating conditions chosen.

Stage 2 is carried out for a period of time sufficient (for example, extending from 10 seconds to 30 minutes) to arrive at homogeneous compositions.

Stage 3 is generally carried out under a reduced pressure of between $20\times10^2$ Pa and $900\times10^2$ Pa, for a period of time sufficient (for example, extending from 10 seconds to 1 hour) to discharge all the volatile materials.

The invention will be better understood with the help of the following examples, which describe the preparation of neutral single-component compositions of alkoxy type which result in crosslinked elastomers having or not having good usage properties, depending on whether or not they correspond to the present invention.

EXAMPLES 1 TO 15

1) Preparation of a Single-Component Organopolysiloxane Composition Not Including a Curing Catalyst (Paste):

1030 g of α,ω-dihydroxylated polydimethylsiloxane oil with a viscosity of approximately 50 000 mPa·s and 33.0 g of crosslinking agent of vinyltrimethoxysilane type are charged to the vessel of a "butterfly" uniaxial mixer. The combined product is mixed at 200 rev/min for 2 min and 4.2 g of a lithium hydroxide functionalization catalyst are introduced into the vessel. The functionalization reaction is allowed to take place for 4 min with stirring at 400 rev/min and then 33.0 g of pyrogenic silica with a specific surface of approximately 150 m$^2$/g are incorporated at a moderate stirring rate (160 rev/min) and then at a higher stirring rate (4 min at 400 rev/min) to complete the dispersing thereof in the mixture. A rather thick but still flowing viscoelastic fluid is obtained. The paste thus obtained is degassed under vacuum (6 min at 130 rev/min under a vacuum of $30\times10^2$ Pa) and then transferred into a container for storage.

2) Addition of the Curing Catalyst to the Paste:

In order to obtain a mastic which crosslinks with atmospheric moisture, it is necessary to add a curing catalyst to the paste obtained above.

For the purpose of comparing different catalysts, a predetermined amount of catalyst, the value of which is given in tables 1 to 4, which appear below, was added, in each example or test, to 30 g of paste.

The different catalysts, tested alone or in combination, are:
tetrabutyl titanate (TBOT, from DuPont de Nemours);
zinc dioctoate, formulated at 80% by weight in a mineral oil, comprising 18% by weight of zinc metal (DOZ, sold by Strem);
aluminum acetylacetonate (ACAC/AL, sold by Strem);
tributyl borate (TBB, sold by Strem);
bismuth carboxylate, comprising 25% by weight of elemental bismuth (K-KAT 348, sold by King Industry).

3) Results:

The catalytic potentialities of each composition were evaluated in two ways:
the skin formation time "SFT" (time at the end of which surface crosslinking is observed); the SFT is measured in the following way: a narrow strip of mastic is deposited and the surface of the narrow strip is, at regular time intervals, made flush with the end of a stick of wood. The skin formation time is determined by the time at the end of which mastic is no longer carried away when the stick is raised;
the hardness (in Shore A) after crosslinking at 23° C./50% RH for 7 days (the hardness is measured on a disk-shaped specimen with a thickness of 6 mm obtained by the superimposition of 3 plaques each with a thickness of 2 mm, according to the instructions of the standard ASTM-D-2240).

3.1) TBOT-ACAC/AL Cocatalysis (Examples 1 to 4):

TABLE 1

| Ex./Tests | [Al], in µg.at/g | [Ti], in µg.at/g | (β) in µg.at/g | (γ) in % | SFT, in hours | Hardness at 7 days (Shore A) |
|---|---|---|---|---|---|---|
| Ex. 1 | 3.8 | 3.8 | 7.6 | 50.0 | 2 | 13 |
| Ex. 2 | 38 | 3.8 | 41.8 | 90.9 | 2 | 15.5 |
| Ex. 3 | 3.8 | 38 | 41.8 | 9.1 | 0.33 | 19 |
| Ex. 4 | 38 | 38 | 76 | 50.0 | 0.33 | 19 |
| Test A | 3.8 | 0 | 3.8 | 100.0 | >4 | 0 |
| Test B | 38 | 0 | 38 | 100.0 | >4 | 10 |
| Test C | 0 | 3.8 | 3.8 | 0.0 | >4 | 0 |
| Test D | 0 | 38 | 38 | 0.0 | 0.5 | 19 |

3.2) TBOT-DOZ Cocatalysis (Examples 5 to 8):

TABLE 2

| Ex./Tests | [Zn], in µg.at/g | [Ti], in µg.at/g | (β) in µg.at/g | (γ) in % | SFT, in hours | Hardness at 7 days (Shore A) |
|---|---|---|---|---|---|---|
| Ex. 5 | 3.8 | 3.8 | 7.6 | 50.0 | 1.75 | 14 |
| Ex. 6 | 38 | 3.8 | 41.8 | 90.9 | 1.5 | 18.5 |
| Ex. 7 | 3.8 | 38 | 41.8 | 9.1 | 0.25 | 21 |
| Ex. 8 | 38 | 38 | 76 | 50.0 | 0.25 | 17.5 |
| Test E | 3.8 | 0 | 3.8 | 100.0 | >4 | 0 |
| Test F | 38 | 0 | 38 | 100.0 | >4 | 0 |
| Test C | 0 | 3.8 | 3.8 | 0.0 | >4 | 0 |
| Test D | 0 | 38 | 38 | 0.0 | 0.5 | 19 |

3.3) TBOT-TBB Cocatalysis (Examples 9 to 12):

TABLE 3

| Ex./Tests | [B], in µg.at/g | [Ti], in µg.at/g | (β) in µg.at/g | (γ) in % | SFT, in hours | Hardness at 7 days (Shore A) |
|---|---|---|---|---|---|---|
| Ex. 9 | 3.8 | 3.8 | 7.6 | 50.0 | 2 | 0 |
| Ex. 10 | 38 | 3.8 | 41.8 | 90.9 | 2 | 2 |
| Ex. 11 | 3.8 | 38 | 41.8 | 9.1 | 0.375 | 20 |
| Ex. 12 | 38 | 38 | 76 | 50.0 | 0.25 | 20 |
| Test G | 3.8 | 0 | 3.8 | 100.0 | >4 | 0 |
| Test H | 38 | 0 | 38 | 100.0 | 2 | 0 |
| Test C | 0 | 3.8 | 3.8 | 0.0 | >4 | 0 |
| Test D | 0 | 38 | 38 | 0.0 | 0.5 | 19 |

3.4) TBOT-K-KAT Cocatalysis (Examples 13 to 15):

TABLE 4

| Ex./Tests | [Bi], in µg.at/g | [Ti], in µg.at/g | (β) in µg.at/g | (γ) in % | SFT, in hours | Hardness at 7 days (Shore A) |
|---|---|---|---|---|---|---|
| Ex. 13 | 6 | 3.8 | 9.8 | 61.2 | 2 | 12.5 |
| Ex. 14 | 24 | 3.8 | 27.8 | 86.3 | 1.75 | 2 |
| Ex. 15 | 6 | 38 | 44 | 13.6 | 0.33 | 20 |
| Test I | 6 | 0 | 6 | 100.0 | >4 | 3 |
| Test J | 24 | 0 | 24 | 100.0 | >4 | 7.5 |
| Test C | 0 | 3.8 | 3.8 | 0.0 | >4 | 0 |
| Test D | 0 | 38 | 38 | 0.0 | 0.5 | 19 |

3.4) Comments:

The data demonstrating a synergistic effect are mentioned in bold in tables 1 to 4 above.

In these tables, it is noticed that there is systematically a concerted action between the catalysts which results in an overall improvement in the cross-linking kinetics. If, for example, DOZ is taken (table 2), it is noticed that the introduction of the combination according to the invention comprising 3.8 µg.at/g (microgram atoms of zinc metal per gram of catalyst-free single-component composition) of DOZ and 3.8 µg.at/g of TBOT results in a reduction in the SFT (which changes to 1.75 hours) and in particular in an acceleration in the crosslinking kinetics for the elastomer, resulting in a Shore A hardness of 14 after 7 days, whereas the use of 3.8 µg.at/g of DOZ or of TBOT, taken alone, results in an SFT of greater than 4 h and a zero hardness after 7 days.

The most advantageous synergies are contributed by the Ti—Al and Ti—Zn cocatalyses.

EXAMPLES 16 TO 21

1) Preparation of Single-Component Organopolysiloxane Compositions Comprising, as Curing Catalyst, Different Amounts of the DOZ+TBOT Catalytic Combination:

704 g of α,ω-dihydroxylated polydimethylsiloxane oil with a viscosity of approximately 135 000 mPa·s, 48 g of α,ω-trimethylsilylated polydimethylsiloxane oil with a viscosity of approximately 100 000 mPa·s, 180 g of α,ω-trimethylsilylated polydimethylsiloxane oil with a viscosity of approximately 100 mPa·s, 79 g of a hydroxylated silicone resin (this resin, of MDT type and having 1% by weight of hydroxyl radicals, is composed of 4% by weight of $(CH_3)_3SiO_{1/2}$ units, 71% by weight of $(CH_3)_2SiO_{2/2}$ units and 25% by weight of $CH_3SiO_{3/2}$ units; this resin exhibits a viscosity of 100 mPa·s at 25° C.) and 36 g of crosslinking agent of vinyltrimethoxysilane type are charged to the vessel of a "butterfly" uniaxial mixer. The combined product is mixed at 200 rev/min for 2 min and 4.6 g of a lithium hydroxide functionalization catalyst are introduced into the vessel. The functionalization reaction is allowed to take place for 4 min with stirring at 400 rev/min and then 114 g of amorphous silica, sold by Degussa under the name R104, are incorporated at a moderate stirring rate (160 rev/min) and then at a higher stirring rate (4 min at 400 rev/min) to bring to completion the dispersing thereof in the mixture. 18 g of methacryloyloxypropyltrimethoxysilane (MEMO) are then added and the curing catalyst formed by the combination of DOZ and TBOT is subsequently introduced according to the amounts which appear in table 4 given below. After mixing at 400 rev/min for 4 min, the stirring rate is reduced to 130 rev/min and the mixture is degassed under vacuum at $20 \times 10^2$ Pa.

2) Results:

Two criteria were monitored:

the tacky feel after crosslinking at 23° C. under 50% relative humidity for 17 hours (three different experimenters were asked to categorize the 4 mastics according to the persistence of the tacky feel); this test consists in causing a roller to run down over the film of crosslinked mastic; the film is deposited on an inclined plane, the slope of which can be varied; the time (in seconds) at the end of which the roller has run down the entire slope is recorded; the slope is varied from 10° to 40°; the results obtained for the slopes of 30° to 40° are very similar and it is not possible to differentiate them.

the ratio (expressed in %) of the hardness (in Shore A) at 24 hours to the hardness at 7 days (the hardness is measured on a disk-shaped specimen with a thickness of 6 mm obtained by the super-imposition of 3 plaques each with a thickness of 2 mm, according to the instructions of the standard ASTM-D-2240); a ratio of 100% means that the maximum of the hardness value was achieved after crosslinking for 24 hours.

TABLE 5

| Examples | TBOT: [Ti], in μg.at/g | DOZ: [Zn], in μg.at/g | (β) in μg.at/g | (γ) in % | Measurement of the tacky feel (10° slope) in s | Ratio of the hardnesses, % |
|---|---|---|---|---|---|---|
| Ex. 16 | 23.55 | 16.79 | 40.34 | 42 | 13.4 | 100 |
| Ex. 17 | 33.14 | 16.79 | 49.93 | 34 | 9.4 | 100 |
| Ex. 18 | 18.89 | 10.46 | 29.35 | 36 | 9.7 | 89 |
| Ex. 19 | 28.49 | 10.46 | 38.95 | 27 | 12.9 | 85 |
| Ex. 20 | 37.79 | 10.46 | 48.25 | 22 | 11.7 | 81 |
| Ex. 21 | 33.14 | 3.85 | 36.99 | 10 | 11.7 | 76 |
| Ex. 22 | 23.55 | 3.85 | 27.40 | 14 | 16.7 | 71 |
| Test K | 37.79 | 0.00 | 37.79 | 0 | 35.9 | 70 |

Comments:

The effects of synergy between the two compounds are slightly different according to whether the tacky feel or the hardness ratio is considered.

As regards the tacky feel, the effect is noteworthy from a very low level of zinc (10%), as is shown by the comparison of example 21 with test K.

As regards the ratio of the hardnesses, the above table allows it to be observed that it changes virtually continuously with the [Zn]/Total ratio with a ratio of 100% reached from a level of Zn of 34%, this being the case without a significant increase in the total amount of catalyst, as is illustrated in example 16. The advantage can be evaluated in this case at an improvement of 50% in the setting kinetics of the silicone elastomer.

It should be noted that, in example 16, the amount of TBOT is reduced by almost 40% with respect to the reference test K and that the setting rate is improved at the same time.

What is claimed is:

1. A single-component polyorganosiloxane composition (POS) which is stable on storage in the absence of moisture and which crosslinks in the presence of water to give a non-yellowing and adherent elastomer, said composition comprising:
   (i) at least one crosslinkable linear polyorganopolysiloxane A of formula:

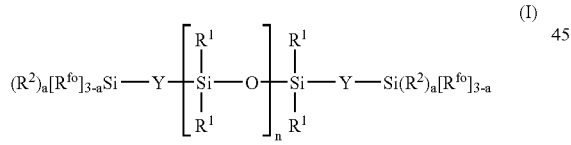

(I)

in which:
   the substituents $R^1$, which may be identical or different, are each a saturated or unsaturated, substituted or unsubstituted, aliphatic, cyclanic or aromatic, $C_1$ to $C_{13}$ monovalent hydrocarbon radical;
   the substituents $R^2$, which may be identical or different, are each a saturated or unsaturated, substituted or unsubstituted, aliphatic, cyclanic or aromatic, $C_1$ to $C_{13}$ monovalent hydrocarbon radical;
   the functionalization substituents $R^{fo}$, which may be identical or different, each represent:
   an iminoxy residue of formula:

$(R^3)_2C=N-O-$ wherein $R^3$ independently is a linear or branched $C_1$ to $C_8$ alkyl radical, a $C_3$ to $C_8$ cycloalkyl radical or a $C_2$-$C_8$ alkenyl radical;

an alkoxy residue of formula:

$R^4O(CH_2CH_2O)_b-$ wherein $R^4$ independently is a linear or branched $C_1$ to $C_8$ alkyl radical or a $C_3$ to $C_8$ cycloalkyl radical and b=0 or 1;
   an acyloxy residue of formula:

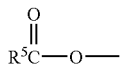

$R^5$ is a saturated or unsaturated, substituted or unsubstituted, aliphatic, cyclanic or aromatic, $C_1$ to $C_{13}$ monovalent hydrocarbon radical;
   an epoxy residue of formula:

$(H)_{b'}(R^5)_{2-b'}C=C(-O-)R^5$ wherein $R_5$ is as defined above and b'=0, 1 or 2;
   each symbol Y represents an oxygen atom or a divalent hydrocarbon radical;
   n has a value sufficient to confer, on the POS A, a dynamic viscosity at 25° C. ranging from 1,000 to 1,000,000 mPa·s;
   a is zero or 1;
   (2i) optionally, at least one polyorganosiloxane resin B functionalized by at least one radical $R^{fo}$ as defined above and having in its structure, at least two different siloxyl units selected from among those of formulae $(R^1)_3SiO_{1/2}$ (M unit), $(R^1)_2SiO_{2/2}$ (D unit), $R^1SiO_{3/2}$ (T unit) and $SiO_2$ (Q unit), at least one of these units being a T or Q unit, the radicals $R^1$, which may be identical or different, are as defined above with respect to the formula (I), said resin having a content by weight of functional radicals $R^{fo}$ ranging from 0.1 to 10%, with the proviso that a portion of the radicals $R^1$ are radicals $R^{fo}$;
   (3i) optionally, at least one crosslinking agent C of formula:

$(R^2)_aSi[R^{fo}]_{4-a}$ (II)

wherein $R^2$, $R^{fo}$ and a are as defined above;
   (4i) optionally, a residual amount of the functionalization catalyst D in the presence of which the preparation of the POS(s) A and of the optional resin(s) B which are functionalized by $R^{fo}$ occurs;
   (5i) optionally, at least one primary aliphatic $C_1$ to $C_3$ alcohol E;
   (6i) optionally, at least one unreactive linear polydiorganosiloxane F which is not functionalized by $R^{fo}$ and which has the formula:

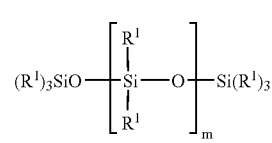

(III)

in which:
   the substituents $R^1$, which may be identical or different, are as defined above for the polyorganosiloxane A of formula (I);
   m has a value sufficient to confer, on the polymer of formula (III), a dynamic viscosity at 25° C. ranging from 10 to 200,000 mPa·s;

(7i) at least one inorganic filler G;
(8i) optionally, at least one auxiliary agent H;
(9i) an effective amount of a crosslinking/curing catalyst I; said composition further comprising the following parameters (α), (β) and (γ):
(α) the curing catalyst I comprises the combination of at least one organic derivative I1 of a metal M1 selected from among titanium, zirconium and mixtures thereof with at least one organic derivative I2 of a metal M2 selected from among zinc, aluminum, boron, bismuth and mixtures thereof;
wherein the amount of curing catalyst I is such that:
(β) the number of μg.at (microgram atoms) of the metals M1+M2 introduced into 1 g of single-component composition comprising all the ingredients (i) to (8i) is within the range from 25 to 55;
(γ) the ratio:

$$\frac{\text{number of μg.at of } M2}{\text{total number of μg.at of } M1+M2} \times 100$$

is within the range from 10 to 45%.

2. The single-component polyorganosiloxane (POS) composition as defined by claim 1, wherein:
the POS A is a polymer of formula (I) in which the symbol Y represents an oxygen atom;
the functionalization substituents $R^{fo}$ of the ingredients A, B and C are of alkoxy type and correspond to the formula $R^4O(CH_2CH_2O)_b$— as defined above; and
the crosslinking/curing catalyst I comprises a combination: of at least one organic derivative I1 of a metal M1 selected from the group consisting of:
monomers I1.1 of formula:

$$[L]_cM1[(OCH_2CH_2)_dOR^7]_{4-c} \qquad (V)$$

in which:
the symbol L represents a ligand;
c represents 0, 1, 2, 3 or 4;
M1 is a metal selected from among titanium, zirconium and mixtures thereof; the substituents $R^7$, which may be identical or different, are each a linear or branched $C_1$ to $C_{12}$ alkyl radical;
d represents zero, 1 or 2;
with the proviso that, when the symbol d represents zero, the alkyl radical $R^7$ has from 2 to 12 carbon atoms and, when the symbol d represents 1 or 2, the alkyl radical $R^7$ has from 1 to 4 carbon atoms;
polymers I1.2 resulting from the partial hydrolysis of the monomers of formula (V) in which the symbol c is at most equal to 3 and the symbol $R^7$ is as defined above with the symbol d representing zero; with
at least one organic derivative I2 of a metal M2 selected from the group consisting of:
the polycarboxylates I2.1 of formula:

$$M2(R^8COO)_v \qquad (VI)$$

the metal alkoxides and chelates I2.2 of formula:

$$(L)_eM2(OR^9)_{v-e} \qquad (VII)$$

in which formulae:
the substituents $R^8$ which may be identical or different, are each a linear or branched $C_1$ to $C_{20}$ alkyl radical;
the symbol $R^9$ is as defined above in the formula (V) for $R^7$;
the symbol L represents a donor ligand;

M2 is a metal of valency v selected from among zinc, aluminum, bismuth, boron and their mixtures;
e represents a number ranging from zero to v.

3. The single-component polyorganosiloxane (POS) composition as defined by claim 1, wherein the substituents $R^1$ of the polymers POS A functionalized by $R^{fo}$, of the optional resins B functionalized by $R^{fo}$ and of the optional non-functionalized polymers F are selected from the group consisting of:
alkyl and haloalkyl radicals having from 1 to 13 carbon atoms,
cycloalkyl and halocycloalkyl radicals having from 5 to 13 carbon atoms,
alkenyl radicals having from 2 to 8 carbon atoms,
mononuclear aryl and haloaryl radicals having from 6 to 13 carbon atoms, and
cyanoalkyl radicals, the alkyl moieties of which have from 2 to 3 carbon atoms.

4. The single-component polyorganosiloxane (POS) composition as defined by claim 1, comprising a crosslinking silane C carrying the functionalization radicals $R^{fo}$: $Si(OC_2H_5)_4$, $CH_3Si(OCH_3)_3$, $CH_3Si(OC_2H_5)_3$, $(C_2H_5O)_3Si(OCH_3)$, $(CH_2=CH)Si(OCH_3)_3$ or $(CH_2=CH)Si(OC_2H_5)_3$.

5. A process for the preparation of the single-component polyorganosiloxane (POS) composition as defined by claim 1, carried out in apparatus, operating batchwise or continuously, whereby:
intimately mixing, with the exclusion of moisture:
in a stage 1, the following constituents: a precursor POS A' or A" of the POS A functionalized by $R^{fo}$, a precursor resin B' or B" (optional) of the resin POS B functionalized by $R^{fo}$, silane, optionally olefinic, carrying the functional groups $R^{fo}$ (which can be the silane C), functionalization catalyst D, alcohol E (optional) and non-functionalized and unreactive POS F (optional);
then, in a stage 2, the reaction mixture from stage 1 supplemented by the addition of the constituents G, H (optional), F (optional) and I; and
discharging the volatile materials present at various points over the course of the process;
during the abovementioned stage 1 and/or
during the abovementioned stage 2 and/or
after stage 2.

6. The process as defined by claim 5, wherein the hydroxylated precursor A' of the POS A functionalized by $R^{fo}$ at the chain ends is an α,ω-hydroxylated polydiorganosiloxane of formula:

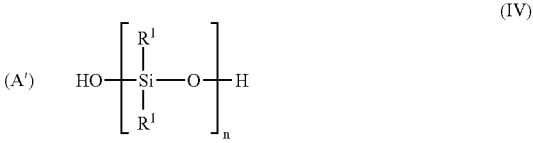

wherein $R_1$ and n being as defined in the formula (I).

7. The process as defined by claim 5, wherein the hydroxylated precursor B' of the optional resin POS B functionalized by $R^{fo}$ corresponds to the above definition for B, except that a portion of the radicals $R^1$ are OH groups.

8. The process as defined by claim 5, including a functionalization catalyst D selected from the group consisting of the following compounds:

potassium acetate, various inorganic oxides, carbamates, lithium hydroxide, sodium hydroxide or potassium hydroxide.

9. A non-yellowing elastomer capable of adhering to various substrates and obtained by crosslinking and curing the single-component silicone mastic composition as claimed in claim 1.

* * * * *